June 1, 1943.  C. FIELD  2,320,858
APPARATUS FOR MAKING METAL WOOL PRODUCTS
Original Filed June 22, 1939  8 Sheets-Sheet 1

INVENTOR
Crosby Field
BY
Blair, Curtis & Hayward
ATTORNEYS

June 1, 1943.　　　　　C. FIELD　　　　　2,320,858
APPARATUS FOR MAKING METAL WOOL PRODUCTS
Original Filed June 22, 1939　　　8 Sheets-Sheet 2

INVENTOR
*Crosby Field*
BY
*Blair, Curtis & Hayward*
ATTORNEYS

June 1, 1943.  C. FIELD  2,320,858
APPARATUS FOR MAKING METAL WOOL PRODUCTS
Original Filed June 22, 1939  8 Sheets-Sheet 4

INVENTOR
Crosby Field
BY Blair, Curtis & Hayward
ATTORNEYS

June 1, 1943.  C. FIELD  2,320,858
APPARATUS FOR MAKING METAL WOOL PRODUCTS
Original Filed June 22, 1939   8 Sheets-Sheet 6

INVENTOR
Crosby Field
BY Blair, Curtis & Hayward
ATTORNEYS

June 1, 1943.  C. FIELD  2,320,858
APPARATUS FOR MAKING METAL WOOL PRODUCTS
Original Filed June 22, 1939    8 Sheets-Sheet 8

INVENTOR
Crosby Field
BY
Blair, Curtis + Hayward
ATTORNEYS

Patented June 1, 1943

2,320,858

UNITED STATES PATENT OFFICE 2,320,858

APPARATUS FOR MAKING METAL WOOL PRODUCTS

Crosby Field, Brooklyn, N. Y., assignor to Brillo Manufacturing Company, Inc., a corporation of New York Original application June 22, 1939, Serial No. 280,532, now Patent No. 2,240,114, dated April 29, 1941. Divided and this application August 2, 1940, Serial No. 349,731

23 Claims. (Cl. 29—1)

My present invention relates to apparatus for making metal wool products and the like, and its novel features are herein disclosed as embodied in apparatus for making steel wool pads; specifically, pads impregnated with soap, and primarily intended for use in cleansing operations, particularly for kitchen and household use.

Certain methods and products herein disclosed are claimed in my prior application, Ser. No. 280,532, filed June 22, 1939, now Patent No. 2,240,114, granted April 29, 1941, of which this apparatus application is a division.

The novel features herein disclosed are preferably combined in a complete machine whereby a fluffy strip of springy steel wool fibers is drawn through successive coordinated rotary mechanisms which operate progressively; first, non-positively feeding the strip; then spreading the strip laterally, widening and thinning it to form a ribbon of a predetermined width and corresponding thinness; then, while in such condition, discharging fluid soap on the ribbon; then squeezing it to thoroughly impregnate it with an excess of soap; then applying predetermined spring pressure to expel excess soap proportionally to the slightly varying amount of the springy fiber; then drying the soap in the ribbon to desired plastic stiffness to render the ribbon relatively inelastic so that for the next succeeding step it is of practically fixed length, width and thickness; then measuring and cutting off successive equal lengths, containing substantially equal amounts of the steel wool fiber and of soap therein.

The latter operation is preferably performed on the peripheral bed of a rotary pad-forming unit from which the completed pads are automatically ejected onto a conveyer, for delivery to a final drying mechanism, which in turn may supply an automatic boxing machine.

Special features of the invention include means for regulating the initial widening of the strip by means applying tension thereto during the widening; means for regulating the degree of pressure applied in impregnating the ribbon with the soap, means employing less pressure, preferably applying it elastically, for squeezing excess soap therefrom; means for drying the resulting ribbon to a desired degree; means for cutting off equal lengths of the ribbon; means for winding the same to form a roll; and means for pressing the roll to predetermined volume to form a flattened pad having steel wool laminae the surfaces of which are more or less stuck together by partially dried soap.

The product is a relatively compact pad, which keeps its shape much better than unsoaped pads, yet readily absorbs water and becomes elastic, when used for washing and scrubbing purposes.

By employing the properly adjustable apparatus hereinafter described, such soaped pads may be produced at high rate and low cost.

The above and other features and advantages of my invention may be more readily understood from the following description in connection with the accompanying drawings, in which

Fig. 1a is a similar diagram showing a modified form of the unit wherein the widener is omitted and a different method is used for impregnating the ribbon with soap;

Fig. 1b is a diagram of an arrangement for continuous supply of wool strip;

Figure 1:
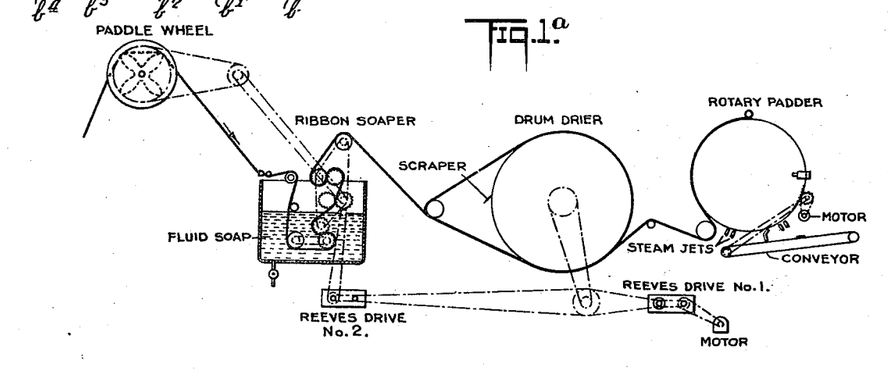
Fig. 1 is a diagram of strip-supplying, widening, ribbon-soaping, partial drying, pad-forming and pad delivery mechanism.

In the diagram, Fig. 1, the fluffy wool strip, $a$, is shown as drawn from a carton, $b$, in which a convenient length thereof has been deposited and being without twist, lies in more or less zig-zag formation.

The rear end of the strip was first carried up over the edge of the carton and hangs down a couple of feet or so, as shown at $c$; and thereafter the strip was allowed to fall into the carton until it was filled. To make clearer what actually happens, it may be well to repeat that Figs. 1 and 1b are entirely diagrammatic; and to explain that in practice the "strip" as customarily drawn from the knives of a metal wool cutting machine, comprises very long, fine, curly fibers that extend lengthwise in the strip; and, when straightened by stretching, they approximate parallelism. Moreover, initially, when fed into receptacle $b$, the strip is a very fluffy, light, flexible, somewhat flattened cylinder. Consequently, the zig-zags, though flatwise and non-twist, do not in fact have the regularity which might be inferred from the merely diagrammatic showing in Figs. 1 and 1b; or even from the showing in Figs. 2 and 3 where the strip has been considerably stretched and thinned.

A continuous supply of wool strip having such characteristics, is kept up by splicing a trailing rear end $c$, to the leading end of an additional length of strip. Such splicing is easily accomplished by intermingling adjacent ragged ends of the strips.

As shown in the detailed diagram, Fig. 1b, the spliced down-hanging portion $c$ includes the leading end of a second carton $b1$, with the wool strip similarly arranged therein; and any number of cartons $b2$, $b3$, $b4$, may be thus joined with intervening loops $c1$, $c2$, $c3$, etc.

Figure 2:
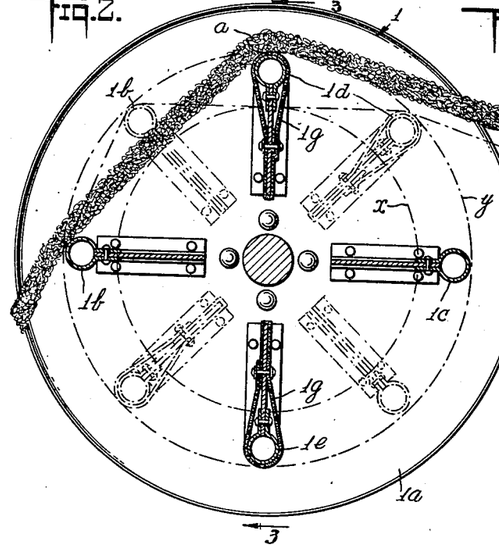
Fig. 2 is a vertical section of the paddle wheel feeder at right angles to the axis, taken on the line 2—2, Fig. 3.

The strip $a$ is drawn from carton $b$ and fed forward by paddle wheel feeder 1 which non-positively feeds and shakes the incoming and outgoing portion of the fluffy strip (see Fig. 2). When the bottom of carton $b$ has been reached, the ribbon continues being drawn over the paddle wheel 1, thus carrying the spliced loop $c$, which includes the leading end of the strip from carton $b2$; and this continues without interruption, thus making it a continuous uninterrupted process.

From the paddle wheel 1, the fluffy strip is drawn into the ribbon-forming widener 2, in which the strip is widened and thinned to predetermined width and corresponding thickness (see Figs. 4, 5, 6, 7). This widened ribbon then passes to and through the roll mechanism 3 for impregnating therein a desired amount of fluid soap (see Figs. 4, 5, 8), the soap being supplied from tank 4 and pipes connected therewith. The soap impregnated ribbon then passes to and around the drier drum 5 (see Figs. 9, 10 and 11). a suitable number of times, thence to the ribbon cut-off, rolling and compressing padder 6 (Fig. 12), the latter being designed and operating somewhat as shown and described in my co-pending application Ser. No. 247,727, filed December 24, 1938, which has matured into Patent No. 2,278,979, of April 7, 1942.

Figure 3:
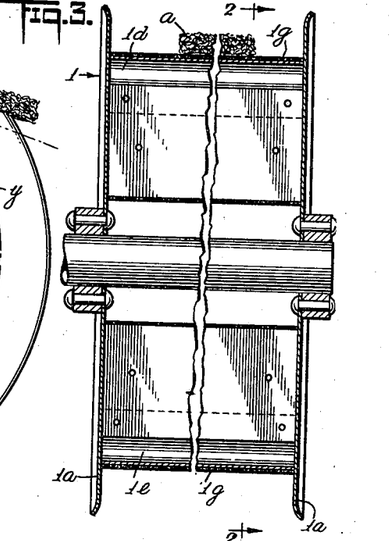
Fig. 3 is a vertical section in the plane of the axis on the line 3—3, Fig. 2.

The paddle wheel feeder shown in Figs. 1, 2 and 3, is rotated at speed required to harmonize with traction of the widener, and subsequent mechanisms, through driving mechanism described hereinafter. As is obvious from Figs. 2 and 3, the paddle wheel consists of parallel end discs $1a$, $1a$, held together by radial webs riveted thereto, the webs terminating in parallel, rounded, preferably cylindrical, strip engaging elements. The peripheries of the discs $1a$, project radially, to afford lateral guide surfaces for the fluffy strips. As shown more clearly in Fig. 2, the paddles, preferably four, are arranged in diametrically opposite pairs, $1b$, $1c$, and $1d$, $1e$. The paddles $1b$, $1c$, being of bare metal, are, or quickly become, polished and slippery so that their engagement with the strip affords relatively slight non-positive feeding effect; but the other pair of paddles, $1d$, $1e$, have their strip engaging portions covered with canvas, $1g$, which affords much greater frictional engagement with the strip so that the feeding effect of each, though slight at times of initial and final engagement with the strip, nevertheless, during the intermediate time of more direct thrust on the strip, they are effective in practically preventing either forward or rearward slip of the strip. As indicated in Fig. 2, the incoming portion of the fluffy strip approaches the paddle wheel at an upward angle somewhat as indicated in said Fig. 2. Similarly, the outgoing forwardly fed portion of the strip slants downward from the paddle wheel to the widener, somewhat as shown. The paddle wheel is thus located adjacent a shifting convergence point of shifting incoming and outgoing portions of the ribbon, so the rotation of the paddle wheel has the effect of rapidly raising and lowering the deflection points of the ribbon.

This will be evident from consideration of an intermediate position of the paddles, as shown in dotted lines, Fig. 2. In this position, the length of strip between the two dotted line paddles, passes much closer to the axis of rotation than in any other position. This position closest to the axis is indicated by circle $x$, and the position most remote from the axis is indicated by circle $y$. Thus the apex portion of the strip is raised and lowered and shifted with considerable rapidity, and at somewhat varying speeds, thereby imparting more or less gentle endwise and transverse wave motion to both the incoming and outgoing portions of the strip. Advantageous results are that the strip is stretched longitudinally, permitting readjustment of the fibers toward parallelism; chips and loose fragments of wool are shaken from the stretching, shifting fibers of the strip; and, as concerns the incoming portion, said motions are very effective in shaking uplifted folds of the strip free from the folds of lower layers, on which they have been resting in the carton.

Another important feature is the relative non-slip of the strip when engaged with the canvas covered paddles $1d$, $1e$, as contrasted with the relatively free slip which is permissible when the support is mainly by direct thrust of the exposed slippery metal contact surfaces of paddles $1b$, $1c$.

In this connection, it should be noted that the paddle wheel is operated at a sufficient speed to progress the wool uniformly when the canvas covered paddles are in engagement therewith, while the tendency of the smooth metal paddle is much less positive; so, that twice during each revolution of the paddle wheel there are instants when the wool strip is quite free to slip. The point is that when an increased rate of feed results from differences in elasticity of the strip, or a substantial increase in the width or weight of a portion of ribbon then passing, the strip will be fed forward too fast, thereby permitting the portion between the paddle wheel and the widener to dip downward to an excessive extent. This is immediately obvious to the operator, who, by merely laying a restraining hand on the strip passing from the carton to the paddle wheel, may retard the strip during one or more of the slip contact instants, thereby restoring the normal tension of this portion of the strip.

The somewhat flattened and stretched steel wool strip passes from the paddle wheel to the widener 2 (Figs. 4 to 7) through a converging guide 2a, friction of which applies some additional resistance and stretching effect as the strip is pulled into the widener. From the guide 2a, the strip passes over a canvas belt 2b, mounted on idle entrance roller 2c and an exit roller 2d, which latter is mounted on shaft 2e rotated by sprocket 2f, through and in synchronism with the rolls of the soaper 3. The intermediate idler rollers 2g are for supporting the belt and strip thereon in operative relation to four gangs of idling discs. The first three gangs are in oppositely skewed pairs operating upon the upper surface of the stretched strip, where it is elastically supported between the idler rolls 2g. The first gang consists of two sets of four discs, 2h, 2i, skewed in opposite directions to spread the upper surface of the strip, from the center line thereof, a certain distance outward.

The second set of discs 2j, 2k, consist of three discs each, interleaved and rotating in parallel planes with discs 2h, 2i, adapted to hold and further stretch edgewise the upper surface of the strip. These discs 2j, 2k, are interleaved with a third set 2m, 2n, rotating in the same planes with the discs 2h, 2i, and operating to further spread and roll outward the upper surface of the strip. A metallic comb, 2z, Fig. 4, projects close to but out of contact with belt 2b, to draw off static electricity, which might otherwise accumulate sufficiently to ignite the metal wool.

The widened strip is then drawn under a single gang of idler discs 2o, extending entirely across the widened strip and rotating in planes exactly parallel with the direction of the movement of the strip, thereby holding it in its laterally spread condition.

Figures 5, 6, 7:
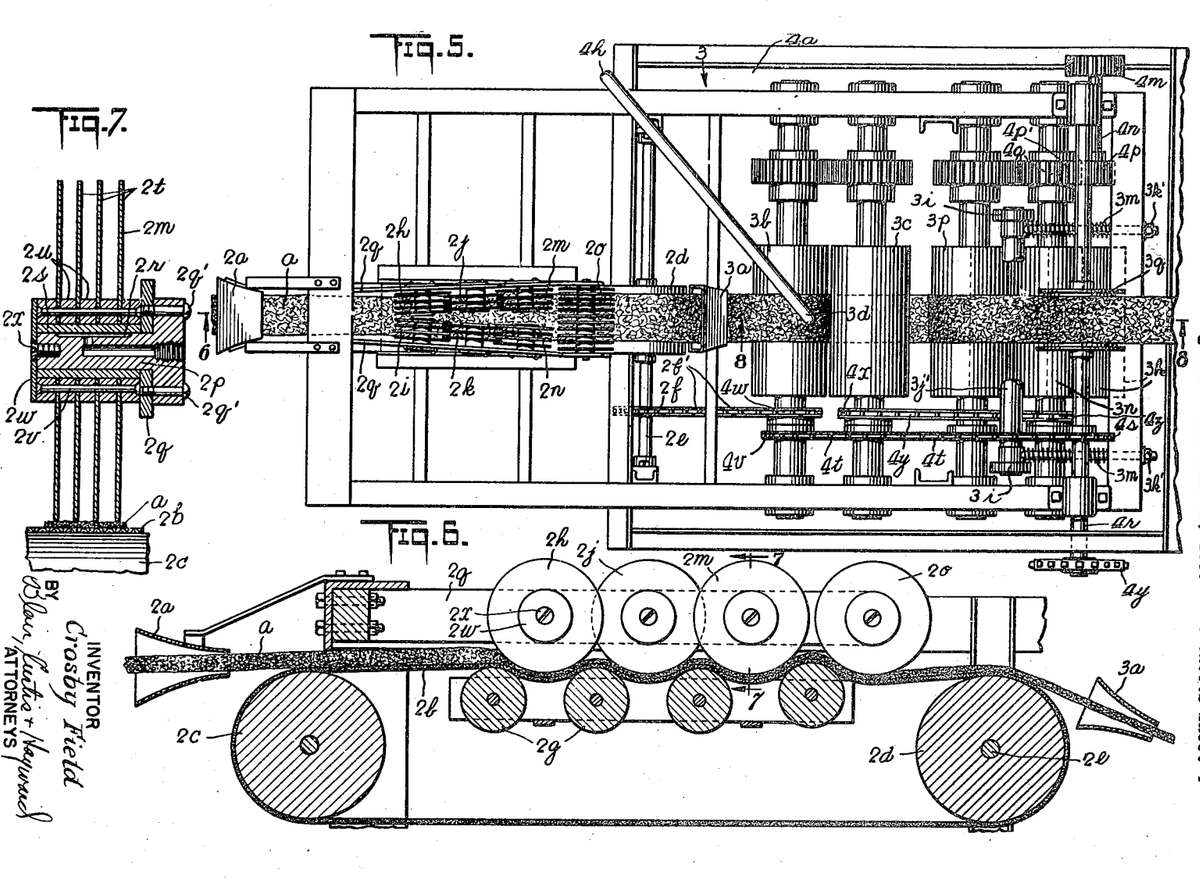
Fig. 5 is a top plan view of the widener and soaper as shown in Fig. 4.
Fig. 6 is a section through the widener on line 6—8, Fig. 5.
Fig. 7 is a vertical section on the line 7—7, Fig. 6, showing one of the widener disc assemblies.

All of these discs are idlers mounted for very free rotation, as shown in Fig. 7, so as to be easily rotated by the strip as it is carried under them on unsupported portions of the canvas belt, assisted by the traction of rolls of the soaper 3.

Fig. 7 shows one of the skewed disc gangs in vertical axial section. Stud shaft 2p projects through and is bolted to stationary side bar 2q, by screws 2q'. It is formed with lubricant ducts 2r, and has an anti-friction metal sleeve 2s fitted thereon. The discs 2t and intermediate spacers 2u, are laterally clamped together by rivets 2v, and this assembly fits sleeve 2s; and these are detachably held on the stud by end plate 2w secured by screw 2x.

The ribbon thus stretched, widened and laterally rolled, passes through the converging wool guide 3a (Figs. 4, 5, 8); then over roll 3b, which is geared to and rotates roll 3c. As most simply shown in Fig. 8, the ribbon passes over the top of roll 3b, and fluid soap of proper consistency is supplied thereon through nozzle 3d. Thence the ribbon carrying the soap passes downward between said rolls 3b, 3c, the pass between being carefully adjusted so as to apply the right pressure for thoroughly impregnating the ribbon with the soap. The adjustment is by screw 3e swivelled in fixed standard 3f.

Figure 8:
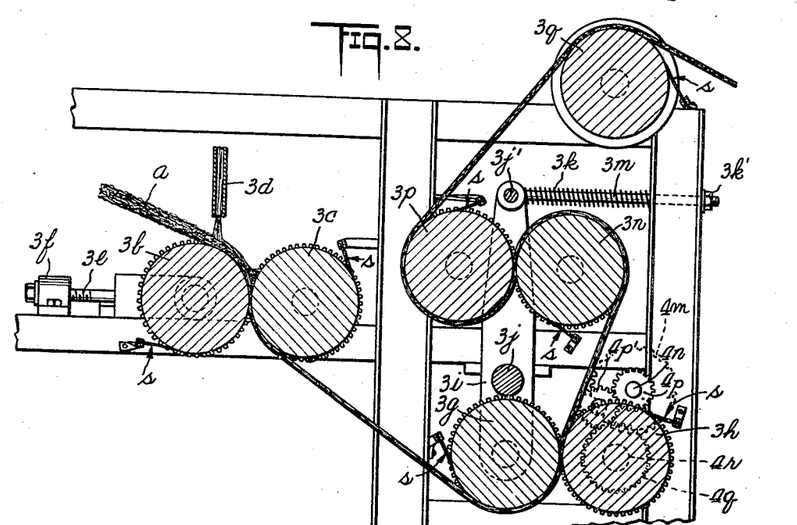
Fig. 8 is a longitudinal vertical section of the soaping roll mechanism, on line 8—8, Fig. 5.

The ribbon being thoroughly saturated, then passes through a second pair of rolls 3g, 3h which are geared together, the roll 3h being the driving roll, while the driven roll 3g is mounted in the ends of two levers 3i, held parallel by the rod 3j', each lever being pivoted at 3j and spring-pressed toward roll 3h by a thrust spring 3k on on a bolt, 3m. Each bolt is adjustably tensioned by a nut 3k' which limits the extent to which roll 3g can swing toward roll 3h, while the spring affords predetermined spring pressure for squeezing excess fluid soap out of the ribbon, and this pressure will be constant regardless of varying thicknesses of said ribbon.

From squeezing rolls 3g, 3h, the ribbon passes over roll 3n and down between it and roll 3p, which is slightly spaced from but geared to roll 3n. From roll 3p, the strip passes up over roll 3q and thence to the drum drier 5. These last three rolls are for applying proper frictional traction on the soaped ribbon, and distributing it over sufficient frictional surface to avoid danger of rupturing the ribbon.

Figures 4, 8B:
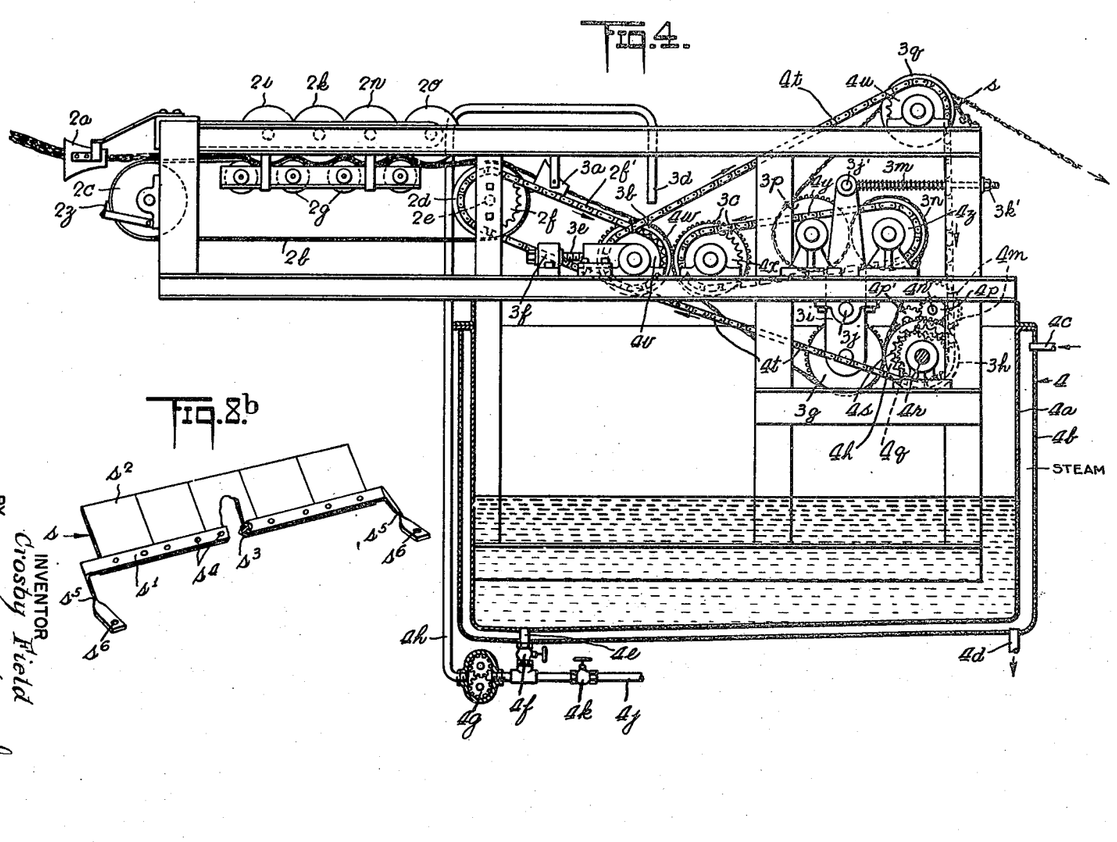
Fig. 4 is a side elevation, partly in section, showing the widener for widening the strip to approximate ribbon form, in combination with the apparatus for impregnating the ribbon with soap.
Fig. 8b is a perspective view of a soap scraper that may be used on the rolls.

All the above described soaping rolls are provided with scrapers s, for removing soap that sticks to them; and, as shown in Fig. 8b, these scrapers may consist of spring blades s2 held between bars s1, s3, by rivets s4; bar s1 including end brackets s5 with holes s6, for securing bolts.

The fluid soap of composition and at temperature necessary for maintaining the proper degree of fluidity (viscosity), say, 180° F. to 185° F., is maintained in tank 4a (Fig. 4), at a level safely below the lowermost of the strip engaging rolls, 3g, 3h, and its temperature is maintained constant by steam circulating in jacket 4b from inlet 4c to outlet 4d. The fluid soap is drawn downward from the bottom of the tank through pipe 4e, controlled by valve 4f and propelled by rotary pump 4g, discharging through pipe 4h, leading to nozzle 3d. Excess soap, if any, falls to the bottom of the tank 4a, for recirculation; and (Figure 1) the intake of the pump is supplied with additional soap from soap kettle 4i through pipe 4j, controlled by valves 4k, 4k.

The various soaping rolls are driven from a source of power described below, through gear 4m (Fig. 5) on drive main shaft 4n, carrying pinion 4p (Fig. 8), meshing with pinion 4p', meshing with gear 4q on shaft 4r of roll 3h, which latter, as above described, is geared directly to the squeeze roll 3g.

As best shown in Fig. 4, the shaft 4r of roll 3h carries a sprocket 4s around which passes sprocket chain 4t, which, as shown by the arrows, slants around sprocket 4v on the shaft of soap impregnating roll 3b, thence back over sprocket 4u on the shaft of the top feed-out roll 3q, thence downward to the sprocket 4s on the shaft 4r of squeeze roll 3h, whence the driving power is derived. The shaft of the first soaping roll 3b carries a sprocket 4w, which through sprocket chain 2f' drives a sprocket 2f on the shaft 2e of roller 2d which drives the widener belt 2b; and sprocket 4x on the shaft of roll 3c drives chain 4y which drives sprocket 4z on the shaft of roll 3n.

Figure 9:
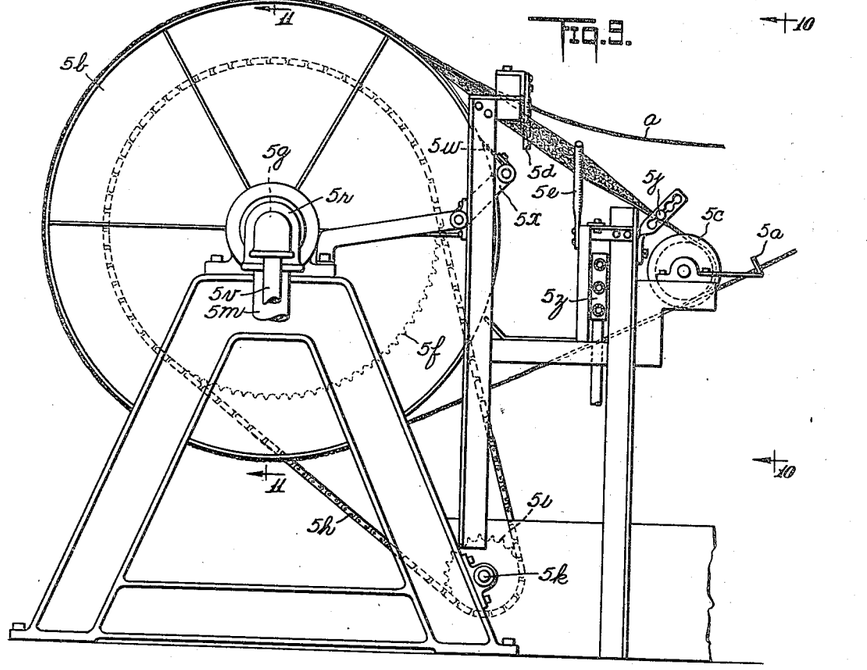
Fig. 9 is a side elevation of the drum for drying the soaped ribbon which is received from the soaper.
Figure 10:
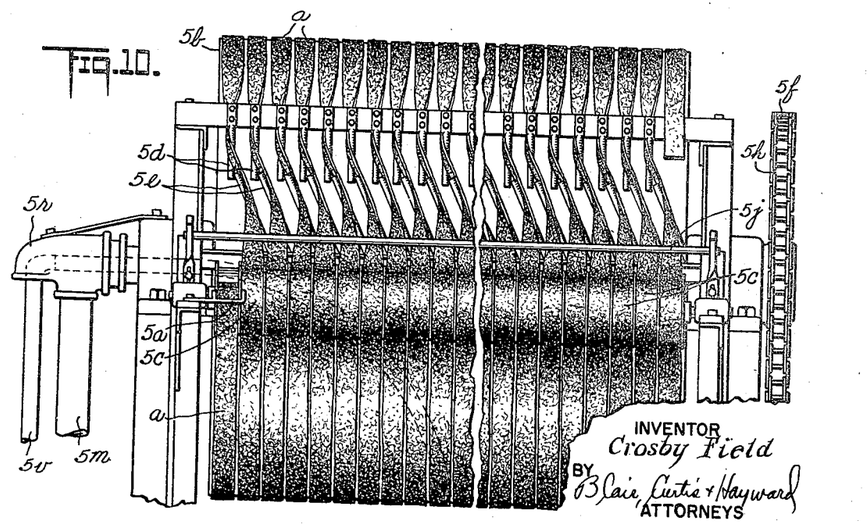
Fig. 10 is an elevation of the same as viewed from the right, as indicated by the arrows 10—10 on Fig 9.
Figure 11:
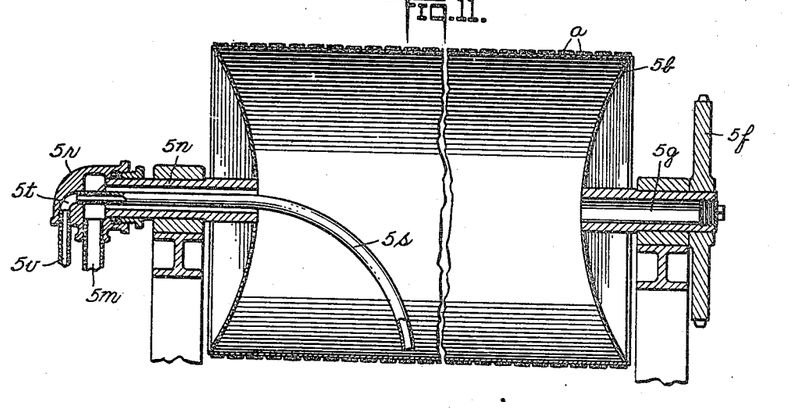
Fig. 11 is a vertical axial section showing the interior of the drier and the means for introducing and removing the heating fluid from the interior of the drum.

The soaped strip, as it leaves the last roll 3q of the soaper, is a relatively thin ribbon of definite width, which then passes to the drum drier 5 (see Figs. 9, 10 and 11). It is now of relatively heavy weight compared with its thickness, and its longitudinal elasticity has been greatly decreased, while an important degree of transverse fluffiness remains.

At the entrance of the drier the ribbon engages between forks of a steadying guide 5a, which damps out vibrations which might otherwise be set up due to the relatively high speed of feed of the ribbon, and which guides the ribbon to the drum, tangent thereto, so that the ribbon is wound thereon as a true-cylinder convolution. As such, it is wound under, up and over the drum 5b until it leaves the drum and passes over and around an idler transfer roller, 5c, which is flanged and properly spaced laterally out of alignment with said first convolution. The portion of the ribbon intervening between its point of tangency with the drum and its point of tangency with the transfer roller, is smoothly guided to permit this lateral shift without distortion; also to axially twist it 180° to bring its exterior face in contact with the drum. For this purpose the ribbon is first engaged by a depending finger 5d, which smoothly twists it 90° for the lateral transfer. It then slants across to the far side of a diagonal guide finger 5e, which smoothly twists it about 45° more, whence it passes under horizontal rod 5j, which completes the 180° twist, and guides it down between the flanges of said transfer roller. This transfer roller, 5c, is slightly more than one ribbon width to the right of the first convolution, so that it presents the ribbon to the drum in a second true cylinder convolution which passes under, up and over the drum to a second twisting finger 5d, then a second diagonal finger 5e, and horizontal rod 5j, turn over and guide the ribbon to a second transfer roller 5c; and so on across the drum. The soaped ribbon is thus completely turned over, contacting the drum on one face and then on the other, and it does this intermittently, until it has been properly cooked on both faces. The intermittent travel of the free portion of each convolution out away from the drum, through the air and back to the drum, permits freer evaporation from the ribbon, and this may be promoted by using steam radiator 5z.

It is to be noted that if the ribbon is dried too much before entering the rotary pad making machine 6, the resulting pad will be a too closely compacted mass of wool and soap; and if it is not sufficiently dry, then the resulting pad will be likely to be irregular in shape.

The above described deflecting transfer fingers, 5d, 5e, and rod 5j, successively engaging opposite faces of the ribbon, operate to smooth and regularize the surfaces so that the ribbon as it passes off to the rotary padder is thin and relatively uniform in width and thickness, as compared with its condition when it passed from the soaper to the drier; and the fibers are stretched and worked to such a degree that its longitudinal elasticity is considerably decreased, although its tensile strength is increased and some of the fibers retain enough resilience to impart a desirable degree of fluffiness. In this connection, it is to be noted that even after being compressed to pad form, the structure is so porous and so many of the fibers are restrained only locally, and often by such thin films of soap, that when dipped in water for scrubbing or scouring purposes, the pad elasticity and resilience increase.

The drum is rotated at desired speed by sprocket 5f, on drum shaft 5g, through sprocket chain 5h, driven by sprocket 5i on shaft 5k, which is driven at speed harmonizing with the other parts of the mechanism, by means described hereinafter.

As best shown in Fig. 11, the steam, heated to desired temperature, say, 300° F., enters through supply pipe 5m and passes into the drum through the rotary hollow shaft 5n which supports the drum. The connection between the stationary supply pipe 5m and the rotary hollow shaft 5n, is through an intermediate elbow 5r, swivelled on hollow shaft 5n.

Condensate is discharged through pipe 5s, the intake of which is held stationary adjacent the lowermost interior surface of the drum, said pipe extending through the axis of the hollow intake shaft 5n and held stationary by the stationary swivelled elbow 5r, the latter being provided with duct 5t through which pipe 5s discharges into outlet pipe 5v.

As indicated Fig. 1 and illustrated Fig. 9, a row of spring scraper blades 5w engage the part of the periphery of the drum where it is left bare by ribbon passing to the transfer rollers 5c. They are held by lever arm 5x, as shown.

As shown in Fig. 1, the ribbon, which has been impregnated with soap in quantity and disposition proper for insuring the desired degree of fluffiness in the pad, passes from the drier 5 over a steadying guide-roll, 6z, to the padder 6, the construction of which, and the operations performed therein, are similar to those described for unsoaped wool ribbon, in my said copending application; with the important difference, however, that for use with soaped ribbon it has been found that soap sticking on the relatively cool parts of the rotary padder, will very soon congeal, and this will interfere with the proper functioning of the padder. This applies particularly to the exterior peripheral bed on which the ribbon is wound, and to the projecting lateral flanges by which it is guided. The mechanism of the padder and recesses in the bed prevent effective use of scrapers such as are used on the drum drier, but I have found that by arranging a suitable number of steam jets, particularly about the periphery of the rotor, as diagrammatically indicated at 6a, 6b, etc. (Fig. 1), they will be effective to wash off and carry out of the line of travel of the ribbon, any such soap; and they will also tend to maintain said periphery, and also the entire interior operating mechanism, at a temperature sufficiently above normal to maintain a suitable degree of plasticity for the soap during the various pad-forming operations.

Figure 12:
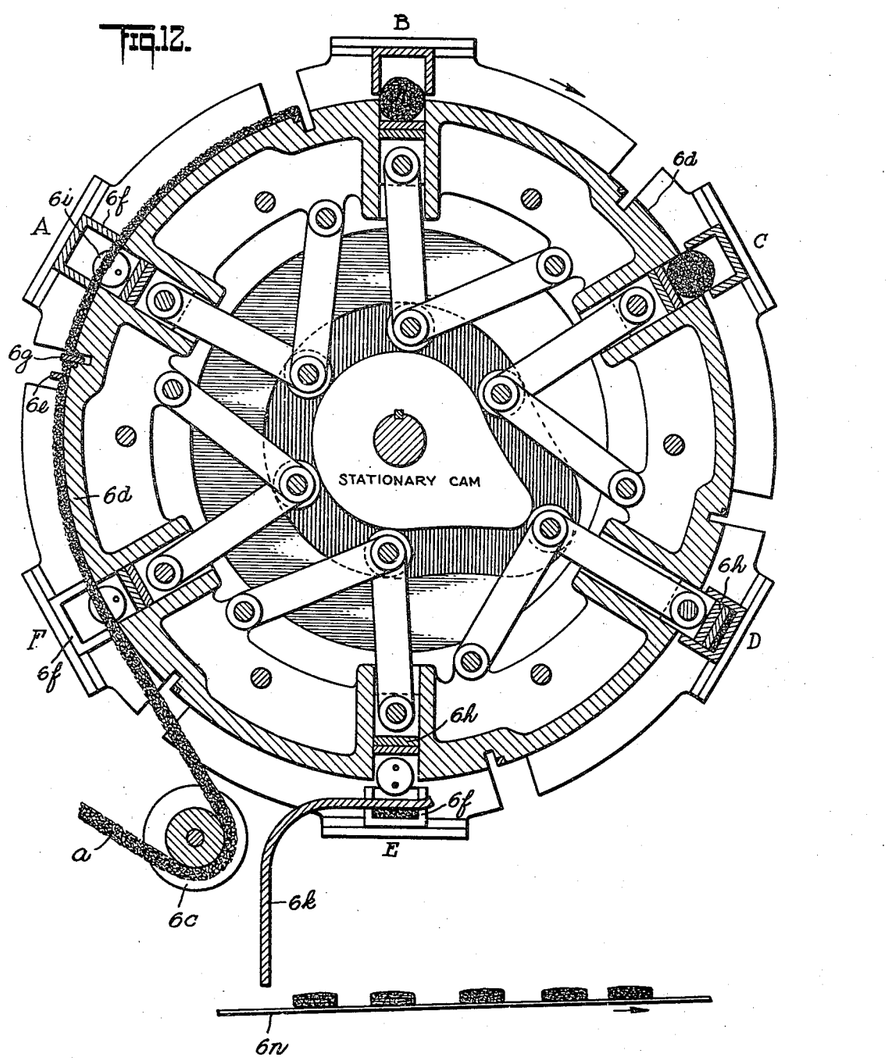
Fig. 12 is a vertical section indicating more or less schematically the phases of operation of the padder.

Referring now to Fig. 12, which, for present purposes, may be considered as a diagram of the operations performed, and without going into details as to the mechanism whereby the various wool engaging instrumentalities are operated, the functions of said instrumentalities may be briefly described as follows:

The ribbon passes to the padder around flanged guide-roller 6c; then around an arc of the peripheral bed 6d, to where it is held by clamp 6e. There are six sets of pad-forming instrumentalities, and as the wheel rotates in the direction of the arrow, pulling the ribbon upward, the ribbon is tensioned enough to make it lie smoothly although, as above noted, its stretchability is limited. Further rotation carries each of the six sets of pad-forming instrumentalities through a cycle of pad-forming operations, successive 60° arcs of operation being indicated by positions A, B, C, D, E, F.

At the lower end of arc A, clamp 6e is holding the end of the ribbon while rotation is wrapping it around a 60° arc of the peripheral bed 6d. A little more rotation will cause the lowermost trough-like boxing-in member 6f which is adjacent F, to be pushed endwise toward the observer into position shown at A, where it forms the two transverse sides and top end of a compression chamber. The parallel edges of the boxer slide over the intermediate portion of the ribbon which is tensioned on the bed. Then a next-following clamp 6e will swing in, and the tensioned ribbon between it and the next preceding clamp will be an accurately measured length suitable for one pad. Then the knife 6g swings in close to lower clamp 6e and cuts off the ribbon between it and boxer 6f, but this lower clamp still continues to hold the rearward cut end of the ribbon until the wheel is rotated enough to bring a succeeding boxer into position A, and a succeeding clamp 6e and its adjacent knife 6g, into their respective clamping and cut-off positions.

A rotation continues, the clamp 6e beyond boxer 6f, releases the forward end of the cut-off length of ribbon which is then retained by the lower edges of the boxer as shown at A, until a spinning head 6i carrying two spinning needles, moves forward toward the observer, into lateral engagement with the boxed-in portion of the ribbon, and winds in the oppositely extending outside portions, thereby forming an approximately cylindrical roll of ribbon. In practice there are two aligned spinners simultaneously engaging the ribbon, edgewise, from opposite sides.

During this operation, the boxer 6f passes position B and approaches position C, where the spinning needles are withdrawn, leaving the rolled-up ribbon in the boxer.

By the time the boxer reaches position D, the piston 6h has compressed the cylinder against the top of the boxer, forming it into a flat pad. Thereupon said boxer slides rearward away from the observer, leaving the compressed pad with its edges wedged between the peripheral side flanges.

Between D and E, the piston retreats, leaving a space below the pad for removal of the pad by stationary stripper 6k, as the rotor carries said pad past position E. These pads fall on conveyer 6n, which carries away the moist or semi-dry pad to a drier where drying is completed.

From position E, the peripheral bed is empty, and the above instrumentalities remain retracted until the padder reaches initial position F, where the incoming ribbon makes tangential contact with the peripheral bed, thus completing rotation which completes six pads.

In the spaces where there is no ribbon on the peripheral bed, the above described steam jets may be applied for cleaning off and washing away soap that may have stuck to the padder.

The proximate local driving means for each unit of the apparatus, have been described in connection with each, but the system whereby the moving parts of all units are harmonized one with another, are best understood by reference to the diagram, Fig. 1.

In general, it may be said that the speed of the final unit, the padder, determines a standard harmonizing speed for the drum drier 5 which precedes it. The drum drier drive shaft is a primary speed determiner for the drive-shaft of the soaper 4, and the soaper drives the widener 2, through gearing imparting the proper speed to its feeder belt; and through another chain of gearings, the soaper drives the paddle wheel feeder at the speed desired for it.

The gearings between the drive-shaft of the soaper and the widener, and the separate drive from a roll shaft of the soaper to the padder, are predesigned for proper cooperation; and though driving speeds of this group as a whole, may be manually adjustable as a whole, the basic speed thereof is made to vary with any change of speed of drive of the drying drum. Hence in practice, it is more convenient to adjust the speed of padder 6, for a practical rate of operations of the complicated mechanism therein and then adjust the speed of units 5, 3, 2 and 1 to supply soaped and partially dried ribbon to the padder when the padder is operating at said practical rate.

Hence, as diagrammatically indicated on Fig. 1, a constant speed motor 7 drives a gear pinion 7a, meshing with gear teeth 7b on a wheel that rotates the padder. Sprocket chain 7c from the shaft of said pinion 7a drives the conveyer that carries away the pads.

The ribbon-forming and drying units are driven from a separate motor 8 which rotates the input shaft of a Reeves drive, which is a well known speed varying mechanism characterized by spaced-apart pulleys and a belt connecting them, the pulleys being adjustable for increasing the effective periphery of the drive pulley 8a and for corelatively decreasing the effective periphery of the driven pulley, 8b, without varying the operative length of the belt between them.

In the present case, the variable speed output shaft, 8b of this Reeves drive No. 1, rotates pulley 8c, on the same shaft with the above described sprocket pinion, 5i on shaft 5k which drives the drum drier through sprocket chain 5h, and sprocket wheel 5f as already described. On the same shaft 5k there is a second sprocket wheel which drives chain 8d which drives the input shaft 8e of manually adjustable Reeves drive No. 2, the variable speed output shaft 8f of which actuates chain 8i driving the previously described main-shaft 4r of the soaper. As shown in Fig. 5, the shaft 4r carries (Figure1) the sprocket 4y which through sprocket chain drive 4z rotates the paddle wheel.

How this shaft drives other shafts of the soaper 3, and of the widener 2, and of paddle wheel 1, has already been described. The point is that the Reeves drive No. 1, controls the speed of the drum drier and this speed cannot be altered without proportionally changing the speed of the input shaft of Reeves drive No. 2; but a secondary or superposed speed variation may be imposed on the soaper, widener and paddle by adjusting said Reeves drive No. 2.

While the padder and Reeves drive No. 1 are shown as driven by separate motors, this is merely for convenience, particularly in running or starting them separately. The motor 8 could be omitted and the padder motor 7 connected to the input shaft 8a of said Reeves drive No. 1; or the hook-up could be otherwise changed in various ways which would provide properly harmonizing speeds for the various mechanisms.

In this connection, it will be recognized that "harmonizing" is not quite the same thing as "synchronizing," since the essential is running certain parts at such relative speeds as will maintain proper tension on the ribbon at critical stages of feed, widening, soaping, drying, and supplying the padder.

Referring again to the steel wool strip, steel wool ribbon, soaped ribbon, and completed soap pad, it will be obvious that it is impossible to illustrate the qualities, quantities or even the appearance of the fibers or of the soap, in India ink drawings conforming to the Patent Office standards, but some of them have been more or less remotely approximated in Figs. 13-16, inclusive.

Figure 13:
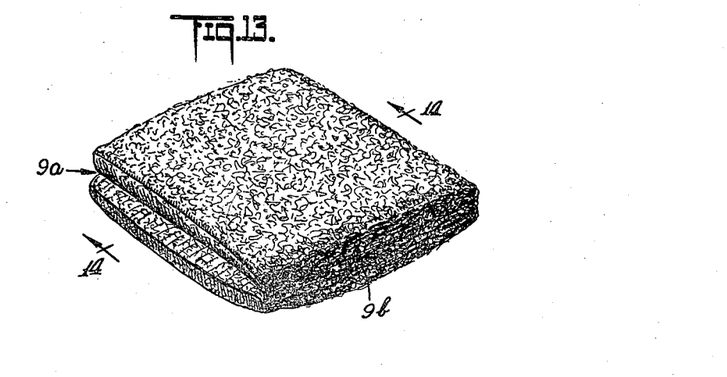
Fig. 13 is a perspective view of the pad.
Figure 14:
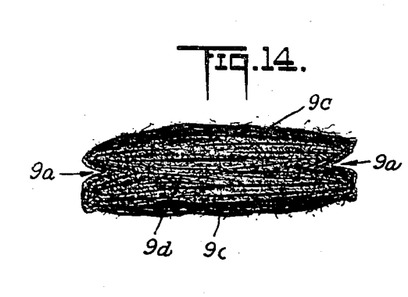
Fig. 14 is a sectional view of the pad on the line 14—14, Fig. 13.
Figure 15:
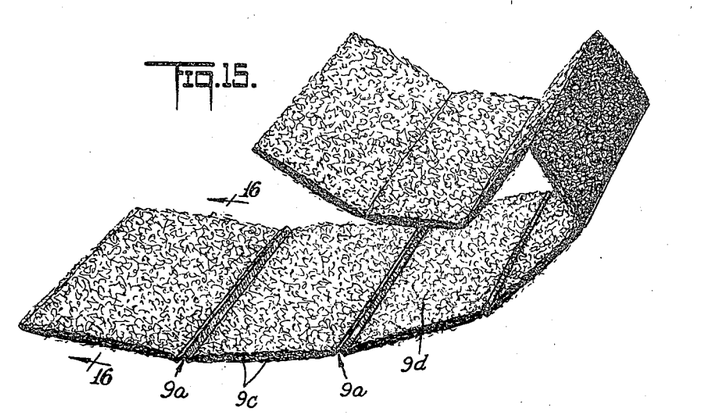
Fig. 15 is a perspective view indicating in a general way the layers constituting the pad when the same is carefully unfolded.
Figure 16:
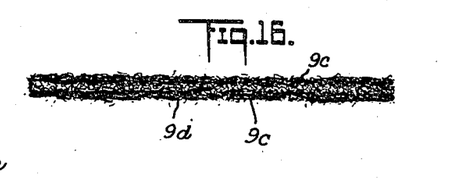
Fig. 16 is a section on the line 16—16, Fig. 15, indicating in a general way the tendency to greater concentration of the soap on the surfaces of the ribbon when layers thereof are pressed in contact to form the pad.

In perspective of the pad, Fig. 13, attempt is made to indicate the reentrantly folded ends of the pad at 9a; also the practically unvarying width of the ribbon, whereby the end 9b of the pad, presents a definite, fairly even plane surface. In cross-section, Fig 14, the approximation of regular reentrant folds 9a at the ends of the pad are shown, and attempt is made to indicate the more or less diffused strata of soap 9c, whereby adjacent surfaces of the ribbon were stuck together; also the relatively fluffy springy layers 9d between them. This is also indicated in the cross-section, Fig. 16.

Figure 8A:
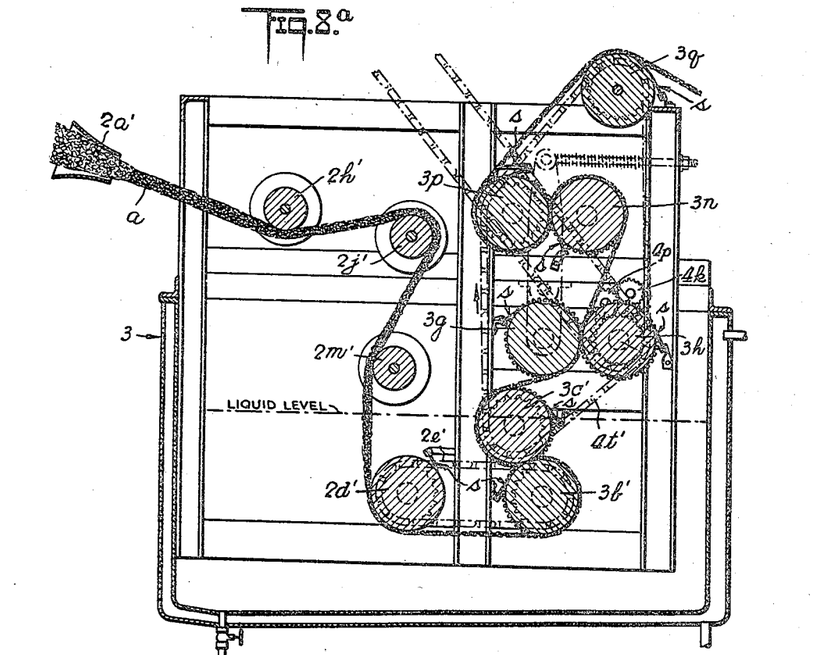
Fig. 8a is a view like Fig. 8, but showing a modified form wherein the ribbon is soaped by submerging it in the fluid soap.

In the modification shown in Figs. 1a, 8a, all parts of the apparatus may be the same as in Fig. 1, except that the widener may be omitted and the soaping rolls are submerged in the fluid soap.

The wool strip passes through funnel 2a', and around flanged idler rolls 2h', 2j', and 2m', which afford some resistance to traction; thence down into the fluid soap, which affords additional resistance; thence around submerged traction roller 2d', which is driven by sprocket chain 2e', driven from the submerged impregnating roll 3b', which is geared to roll 3c'. The pair of rolls 3b', 3c', being for the purpose of impregnating the tensioned ribbon with fluid soap, the roll 3b' may be made vertically adjustable to vary the spacing of the pass between them, similarly to rolls 3b, 3c, of Fig. 8. From roll 3c', the impregnated ribbon passes to squeeze rolls 3g, 3h, which are located above the level of the liquid the same as in Fig. 8, and above these are the same frictional traction rolls 3n, 3p; and the final exit roll 3q, as in Fig. 8.

Because of this new submerged position of impregnating rolls 3b', 3c', the drive from shaft 4r of the stationary squeeze roll 3h, is through a sprocket chain 4t' which slants downward around the sprocket of the fixed impregnating roll 3c', then directly upward over the sprocket of friction roll 3p, then up over the sprocket of the exit friction roll 3q, then straight down to the sprocket of the fixed squeeze roll.

In this Fig. 8a modification, each soaping roll is provided with a scraper, s, like those used in the preferred soaper, Fig. 8.

When widener 2 is thus omitted, the funnel 2a' idler rolls 2h', 2j', 2m', together with the viscosity and depth pressure of the fluid soap, oppose the traction, and thereby considerably stretch, flatten and widen the strip toward ribbon form; but these effects are somewhat less regular than in the preferred form; so, it results that the flattening and widening of the ribbon, are somewhat less regular and seem to occur mostly in the excess squeezing rolls 3g, 3h. Moreover when such ribbon is submerged, it does not take the soap in quite the same way, because the ribbon has not been stretched laterally. The soap seems not to penetrate as deeply below the surface of the ribbon; and the amount of soap impregnated is not so easily adjusted.

For either form of soaper (Figs. 1, 1a) the fluffy metal wool strip may be supplied in any desired way; and where automatic means or methods are employed, they may be widely varied. For such variation, the order of importance of the generic and specific novel features herein disclosed are, first, non-positive traction for the feed means; second, traction by a power driven motor having peripheral contact surface of relatively great friction traction, alternating with surfaces of minimum traction; third, non-contacting peripheral spaces between surfaces of maximum and minimum traction, to permit the varying traction to cause radial and endwise shaking of the strip; fourth, non-thrust, horizontal-layer arrangement of the strip supply in a receptacle, or a series of such receptacles having the end of the bottom layer of one receptacle connected with the leading end of the top layer of the next receptacle.

There are several important reasons why all my purposes are best served by the above described cascade-like arrangement of a series of separate receptacles, each adapted to loosely contain zig-zags of the fluffy wool strips. A primary reason is that the rotary padder, which sets the speed of all antecedent parts of the apparatus, produces pads at a very high rate; and this uses up the strip faster than it is now customarily produced by any one group of knives of a steel wool cutting machine; consequently, I prefer to keep up the strip supply by taking lengths as long as can be conveniently handled, either from different machines, or from several different groups of knives of a single machine. Furthermore, the speed of operation of the drum drier and also of the ribbon widener and soaper have to be delicately adjusted; also, as heretofore explained in great detail, it is desirable to have the rate of supply of fluffy strip, delicately responsive to end traction of the widener, applied through a considerable length of strip, freely suspended, and said length is kept up by non positive, self accommodating feeding means.

The means for and method of applying the viscous fluid soap may be varied, provided it permits of properly controlling the amount and distribution of the soap in the ribbon.

The means for and method of drying soaped ribbon may be varied provided it permits of properly controlling the temperature and degree of drying or cooking of the soap.

The partially dried soaped ribbon may be cut in lengths and shaped as pads by hand or with or without auxiliary mechanism, but where a compressor is used it is preferably heated and cleaned by steam jets.

While these and other variations, or omissions are possible, without departing from the spirit of my invention, it will be obvious that every one of the novel features hereof, is specifically designed for use in combination with all other novel features, and that such omissions or variations are likely to be detrimental, in greater or less degree.

Although the plant disclosed herein has been described in connection with the impregnating of metal wool pads with soap it will be understood that it is not necessarily limited to this specific use by may be employed for impregnating or otherwise combining other fibrous materials with other liquids or paste.

I claim:

1. A plant for making resilient, soap-containing metal wool pads from a continuously supplied strip of fluffy metal wool, said plant serially including a high-level rotor for lifting and nonpositively feeding the strip; resistance and traction means for tensioning and widening the strip to form a ribbon of standard width and thickness; means including rolls for forwarding said ribbon under tension and while under tension, impregnating it with hot fluid soap; rolls for elastically applying predetermined pressure to squeeze out excess soap; means for progressively drying both surfaces of the soaped ribbon to a predetermined degree while maintaining tension thereon; said means including a heated drier drum around which the ribbon is tensioned, the transfer means for guiding the ribbon from and to said drum in a series of convolutions and twisting the ribbon during transfer to apply first one surface, and then the other against the surface of the drum; a rotary padder along the periphery of which the partially dried ribbon is wound; said padder including means for cutting off successive predetermined lengths of the ribbon, means for edgewise engaging each length and winding it to form a roll, and means for compressing the roll diametrically to form a pad, in combination with means for driving the rotary padder at constant speed; adjustable means for rotating the drier drum at the speed required for supplying ribbon at the set speed of the padder; and means for driving the soaper, tensioner and feeding rotor from a driven shaft of the drum through an intervening adjustable speed chamber.

2. A plant for making resilient, soap-containing metal wool pads from a continuously supplied strip of fluffy metal wool, said plant serially including a high-level rotor for lifting and non positively feeding the strip; resistance and traction means for tensioning and widening the strip to form a ribbon of standard width and thickness; means including rolls for forwarding said ribbon under tension and while under tension, impregnating it with hot fluid soap; rolls for elastically applying predetermined pressure to squeeze out excess soap; means for progressively drying both surfaces of the soaped ribbon to a predetermined degree while maintaining tension therein, said means including a heated drier drum around which the ribbon is tensioned, transfer means for guiding the ribbon from and to said drum in a series of convolutions and twisting the ribbon during transfer to apply first one surface and then the other against the surface of the drum; and a rotary padder along the periphery of which the partially dried ribbon is wound; said padder including means for cutting off successive predetermined lengths of the ribbon, means for edgewise engaging each length and winding it to form a roll, and means for compressing the roll diametrically to form a pad, in combination with means for driving the several elements of the plant at harmonizing speeds.

3. Apparatus for making resilient, soap-containing metal wool pads from a continuous strip of fluffy metal wool, said apparatus including means for forwarding and tensioning the strip and impregnating it with hot fluid soap; means for squeezing out excess soap; means for partially drawing the ribbon; and padder means whereby the partially dried ribbon is cut into successive predetermined lengths and each length is formed into a pad, in combination with means for driving the padder means at the desired constant speed; adjustable means for rotating the drier drum at the speed required for supplying ribbon at the set speed of the padder means; and means for driving the soaper from a driven shaft through an intervening adjustable speed changer.

4. Apparatus for making resilient, soap-containing metal wool pads from a continuously supplied strip of fluffy metal wool, said apparatus including means for forwarding and tensioning the strip and impregnating it with hot fluid soap; means for squeezing out excess soap; means for partially drying the ribbon; and means whereby the partially dried ribbon is cut into successive predetermined lengths and each length is formed into a pad, in combination with means for driving the several elements of the apparatus at harmonizing speeds.

5. Apparatus specified in claim 4, and in which the means for supplying the continuous strip includes a power driven rotor having relatively small-area strip-contacting peripheral surfaces of relatively great frictional traction, alternating with strip-contacting surfaces of minimum traction.

6. Apparatus specified in claim 4, and in which the means for supplying the continuous strip includes a power driven rotor having relatively small-area strip-contacting peripheral surfaces, said surfaces being separated by relatively great non-contacting peripheral spaces to permit the varying traction to cause radial and endwise shaking of the strip.

7. Apparatus specified in claim 4, and in which the means for supplying the continuous strip includes a power driven rotor having relatively small-area strip-contacting peripheral surfaces of relatively great frictional traction, alternating with strip-contacting surfaces of minimum traction, said surfaces being separated by relatively great non-contacting peripheral spaces to permit the varying traction to cause radial and endwise shaking of the strip.

8. Apparatus specified in claim 4, and in which the means for tensioning the strip includes idler discs engaging a surface of the strip in oppositely skewed pairs, and traction means for drawing the strip under said skewed idler discs.

9. Apparatus specified in claim 4, and in which the means for tensioning the strip includes successive oppositely skewed pairs of gangs of idler discs, and a final gang of similar discs rotating in planes parallel with the direction of feed of the strip.

10. Apparatus specified in claim 4, and in which the means for impregnating the tensioned strip includes a pair of rolls geared together with an adjustable mounting for rigidly predetermining the thickness of the pass between them, and means for discharging hot fluid soap on the metal wool strip on the entrance side of said pass.

11. Apparatus specified in claim 4, and in which the means for squeezing out excess soap includes a pair of rolls geared together, at least one of said rolls being mounted in movable bearings with adjustable means for positively limiting movement of said bearings toward the other roll, and constant pressure resilient means yieldably opposing movement away from said other roll, whereby constant pressure is applied for squeezing out the excess soap, independently of the thickness or resilience of the steel wool strip.

12. Apparatus specified in claim 4, and in which the drier is a hollow drum with means for internally heating it to constant temperature and with cooperating means for guiding the soaped strip to the drum in a true cylinder convolution, and transfer means for guiding a portion of each convolution from one cylindrical path to the next succeeding parallel cylindrical path.

13. Apparatus specified in claim 4, and in which the drier is a hollow drum with means for internally heating it to constant temperature and with cooperating means for guiding the soaped strip to the drum in a true cylinder convolution, and transfer means for guiding a portion of each convolution from one cylindrical path to the next succeeding parallel cylindrical path, together with intermediate guide means for twisting the strip through 189° between each convolution to present its opposite face in contact with the surface of the drum.

14. Apparatus specified in claim 4, and in which the drier is a hollow drum with means for internally heating it to constant temperature and with cooperating means for guiding the soaped strip to the drum in a true cylinder convolution, and transfer means for guiding a portion of each convolution from one cylindrical path to the next succeeding parallel cylindrical path, together with intermediate guide means for twisting the strip through 180° between each convolution to present its opposite face in contact with the surface of the drum; said intermediate guide means for each convolution including successive fingers for deflecting and twisting the strip through successive angles to a final guide which is parallel with the axis of the drum and which guides the strip between side flanges of an idle roller which registers with the path of the next succeeding convolution on the drum.

15. Apparatus specified in claim 4, and in which the means for forming the pad includes a compression chamber having movable wall elements for entrance of the strip and removal of the compressed pad, in combination with steam jets for cleaning and heating said movable walls.

16. Apparatus specified in claim 4, and in which the means for forming the pad consists of a rotor formed with a peripheral bed on which the partially dried soaped ribbon is wound, means for severing the ribbon into successive pad-lengths, means for boxing-in an intermediate portion of the ribbon, means engaging a boxed-in portion of the ribbon and spinning it into a roll, and means for compressing the roll and unboxing the pad, in combination with steam jets for cleaning and heating the peripheral bed and the exposed pad-forming instrumentalities.

17. Means for forming a pad from a soaped partially dried ribbon of metal wool, said means including a compression chamber having movable wall elements for entrance of the strip and removal of the compressed pad, together with steam jets for cleaning and heating said movable parts.

18. Means for forming a pad from a soaped partially dried ribbon of metal wool, including a rotor formed with a peripheral bed on which the partially dried soaped ribbon is wound, means for severing the ribbon into successive pad-lengths, means for boxing-in an intermediate portion of the ribbon, means engaging a boxed portion of the ribbon and spinning it into a roll, and means for compressing the roll and unboxing the pad, in combination with steam jets for cleaning and heating the peripheral bed and the exposed pad-forming instrumentalities.

19. Apparatus for making soap-containing metal wool pads from a continuous strip of fluffy metal wool, said apparatus including a reservoir of hot fluid soap, a submerged traction roll for drawing the fluffy strip downward to a predetermined depth, against the viscosity resistance and the depth pressure of the fluid soap, thereby tensioning the strip; a cooperating roll for deflecting and flattening the soaped strip, and a pair of rolls above the level of the soap applying spring pressure; means for partially drying the ribbon; and means whereby the partially dried ribbon is cut into successive predetermined lengths and each length is formed into a pad.

20. Apparatus for making resilient soap-containing pads from fluffy metal wool strips, serially including means for tensioning the strip and widening it to form a ribbon of uniform width equal to that of one of the edges of the desired pad; means for impregnating the ribbon with a predetermined limited amount of hot fluid soap sufficiently diffused to bind only a predetermined portion af the fibers; a drier for partially drying the thus soaped ribbon; means for successively cutting off lengths of said ribbon and for forming each length of ribbon into a pad, and for compressing each pad sufficiently for the soap to cause adhesion of adjacent fiber surfaces of the pads while preserving substantial resilience and porosity of the resulting pad.

21. Apparatus for making resilient soap-containing metal wool pads comprising means for feeding a continuous strip of fluffy metal wool, means for widening said strip, means for impregnating said strip with soap and means for forming predetermined lengths of the strip into relatively dense pads.

22. A plant for impregnating a mass of fibrous material with liquid or paste comprising means for feeding a strip of fibrous material, means for widening said strip, means for impregnating said strip with liquid or paste and means for forming predetermined lengths of the impregnated strip into compact pads of predetermined shape.

23. Apparatus for impregnating a strip of fibrous material and converting it into pads comprising means for forwarding and tensioning the strip, means for impregnating it with liquid, means for squeezing out excess liquid, means for partially drying the strip, means for severing the strip into successive predetermined lengths, means for winding each length into a cylinder and compressing the cylinder into a pad, and means for driving the several elements of the apparatus at harmonizing speeds.

CROSBY FIELD.

CERTIFICATE OF CORRECTION.

Patent No. 2,320,858.            June 1, 1943.

CROSBY FIELD.

It is hereby certified that error appears in the printed specification of the above numbered patent requiring correction as follows: Page 5, first column, line 28, for "A" read --As--; page 6, second column, line 75, for "by" read --but--; page 7, first column, line 75, claim 3, for "drawing" read --drying--; page 8, first column, line 23, claim 13, for "189°" read --180°--; and second column, line 35, claim 20, for "af" read --of--; and that the said Letters Patent should be read with this correction therein that the same may conform to the record of the case in the Patent Office.

Signed and sealed this 25th day of January, A. D. 1944.

(Seal)                        Henry Van Arsdale,
                             Acting Commissioner of Patents.